United States Patent
Goering et al.

(10) Patent No.: US 8,056,312 B1
(45) Date of Patent: Nov. 15, 2011

(54) REDUCED MASS HIGH SPEED DOFFER COLUMN WITH IMPROVED SHAFT PRELOAD

(75) Inventors: Kevin J. Goering, Cambridge, IA (US); Joel M. Schreiner, Ankeny, IA (US); Jeffrey R. Fox, Minburn, IA (US); Mark B. Vollmers, West Des Moines, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/898,808

(22) Filed: Oct. 6, 2010

(51) Int. Cl.
*A01D 46/16* (2006.01)

(52) U.S. Cl. .......................................................... 56/41

(58) Field of Classification Search .............. 56/41, 28, 56/44, 40, 50, 48, 49
See application file for complete search history.

(56) References Cited

U.S. PATENT DOCUMENTS

| | | | |
|---|---|---|---|
| 2,664,689 A * | 1/1954 | Walker et al. ...................... 56/41 |
| 2,699,026 A | 1/1955 | Cassidy | |
| 2,699,027 A | 1/1955 | Hubbard | |
| 2,699,028 A | 1/1955 | Cassidy | |
| 2,699,029 A | 1/1955 | Hubbard | |
| 2,770,086 A | 11/1956 | Knoth | |
| 3,014,332 A * | 12/1961 | Hubbard ........................ 56/41 |
| 3,048,962 A | 8/1962 | Hubbard | |
| 3,224,178 A * | 12/1965 | Kennedy ........................ 56/41 |
| 3,245,210 A * | 4/1966 | Hubbard ........................ 56/44 |
| 3,427,791 A * | 2/1969 | Hubbard ........................ 56/41 |
| 3,439,788 A * | 4/1969 | Fergason ................... 192/48.6 |
| 4,742,672 A * | 5/1988 | Orsborn ........................ 56/41 |
| 4,819,415 A * | 4/1989 | Engelstad et al. ............... 56/41 |
| 4,866,918 A * | 9/1989 | Engelstad et al. ............. 56/10.3 |
| 5,014,502 A * | 5/1991 | Richman et al. .................. 56/41 |
| 5,038,552 A * | 8/1991 | Thedford et al. ................ 56/44 |
| 5,325,656 A * | 7/1994 | Schreiner et al. ........... 56/10.2 H |
| 5,557,911 A * | 9/1996 | Sanderson et al. ............... 56/41 |
| 5,642,608 A * | 7/1997 | Sanderson ...................... 56/28 |
| 6,415,589 B1 * | 7/2002 | Yribarren et al. ................ 56/41 |

* cited by examiner

*Primary Examiner* — Arpad Fabian-Kovacs

(57) ABSTRACT

A light-weight upright shaft (14) supports cotton harvester doffers (12). An internally threaded mounting end (36) receives a bolt (38) which is stretchable to a greater degree than the shaft to provide a reliable shaft preload condition that prevents the doffers from spinning relative to the shaft. The shaft may be hollow and may have a diameter greater than conventional shafts to reduce weight and increase the stiffness and thereby increase critical speed. The preload structure does not require a nut and has increased thread engagement.

16 Claims, 2 Drawing Sheets

REDUCED MASS HIGH SPEED DOFFER COLUMN WITH IMPROVED SHAFT PRELOAD

FIELD OF THE INVENTION

The present invention relates to doffer columns for spindle type cotton harvesters.

BACKGROUND OF THE INVENTION

Previously available doffers for spindle type cotton pickers include a stack of doffers, or pads, supported on a solid shaft. Some pads are in the shape of a flat disk with spacers inserted between each pad. The disks are sandwiched between the spacers, and a nut threaded on external threads at the end of the solid shaft tightly clamps the disks and spacer for rotation of the pads and spacers in unison with the solid shaft. Examples of such structures are illustrated in U.S. Pat. No. 4,819,415. Alternatively, the doffers may include integral axially extending hubs of cast aluminum in place of the separate spacers, such as shown in U.S. Pat. No. 5,014,502. If there is insufficient tensioning preload on the assembled doffer, the doffer can spin relative to the shaft. Once the pads begin to spin, the pads further loosen on the shaft, and the entire doffer column usually must be rebuilt.

The threaded stub shaft at the bottom of the doffer column receives a tensioning nut to provide the preload that sandwiches the doffers and spacers or hubs for rotation together with the doffer shaft. The small amount of mounting space at the lower end of the column usually requires a relatively thin nut with a minimal amount of thread engagement.

The doffer columns normally operate near the critical operating speed. If the doffer shaft is operated in an over-speed condition for even a short period of time, the shaft may bend. Therefore, increasing the critical operating speed of the doffer columns helps to eliminate shaft bending.

SUMMARY OF THE INVENTION

A doffer column includes a low weight doffer shaft supporting doffers and spacers or hubs. An internally threaded tensioning member at one end of the shaft tightly sandwiches the pads and spacers or hubs together for rotation in unison with the shaft. The tensioning member provides sufficient preload to prevent rotation of the pads relative to each other and to the shaft. In the embodiment shown, the tensioning member may be an elongated bolt threaded into a receiving member secured to the bottom of a hollow doffer shaft. The internal threads provide more thread engagement than the typical short external nut configuration of the prior art. The construction also facilitates use of a bolt that is sufficiently long for good bolt stretch to provide adequate preload for tight joints. A short external nut may be eliminated. The shaft may be of hollow construction with an outer diameter greater than the outer diameter of previously available solid shafts to decrease weight, increase stiffness and increases the critical speed of the doffer column.

DESCRIPTION OF THE PREFERRED EMBODIMENT

Figure 1:
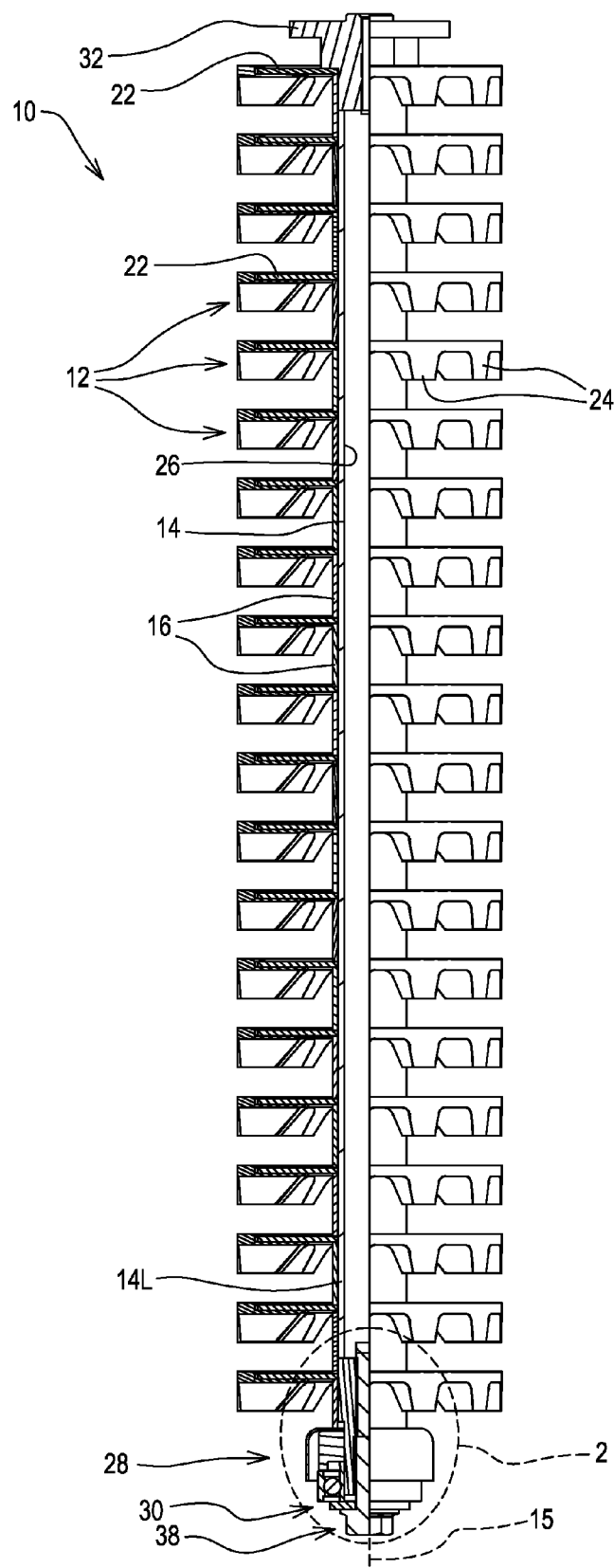
FIG. 1 is a plan view of a doffer column assembly, partially in section.

Referring to FIG. 1, therein is shown a doffer column assembly 10 for the harvester row unit of a conventional cotton picker. The doffer column structure 10 includes doffers 12 supported on an upright shaft 14 for rotation about a shaft axis 15. The doffers 12 are vertically spaced on the shaft 14 by spacers 16. Alternatively, the spacers may be replaced by extended hubs on the doffers 12. The doffers 12 rotate with the shaft 14 above rows of the spindles and unwrap and remove cotton from the spindles in the row.

Each of the doffers 12 includes a generally horizontal circular metal disk or base plate 22 supporting radially outward and downwardly directed lugs 24 in a conventional manner. A round aperture 26 of diameter slightly greater than the diameter of the shaft 14 is located in the center of the base plate 22. The doffers 12 are slid into position on the shaft 14 with a spacer 16 inserted on the shaft between adjacent doffers. A retention assembly 28 and bearing assembly 30 mount a lower end 14L of the upright shaft 14 to the base of floor of the harvester row unit. An upper mounting flange 32 secured to an upper end 14U of the shaft 14 adjacent the uppermost doffer base plate 22 mounts the upper end 14U to the row unit adjacent a row unit drive assembly (not shown) located in an upper portion of the row unit housing and drivingly connected to the flange 32. The retention assembly 28 tensions the shaft 14 to firmly secure the doffers 12 and spacers 16 between the flange 32 and the bearing assembly 28 for rotation of the doffers and spacers in unison with the upright shaft. The retention assembly 28 preloads the shaft 14 sufficiently to prevent the doffers from rotating relative to the upright shaft 14.

The retention assembly 28 includes an internally threaded member 36 supported at one of the mounting ends of the upright shaft 14 and a tensioning member 38 threaded into the internally threaded member 36 for sandwiching the doffers 12 and spacers 16 between the upper and lower ends for rotation in unison with the upright shaft 14. The tensioning member 38 may be an elongated bolt having threads 40 engaging internal threads 42 of the member 36. The member 36 may be fixed to the lower end 14L of the shaft 14 by any suitable connecting method. For example, the member 36 may be fabricated from metal and friction welded at location 46 to the end of the shaft 14. The member 36 may also be connected by arc welding or brazing.

Figure 2:
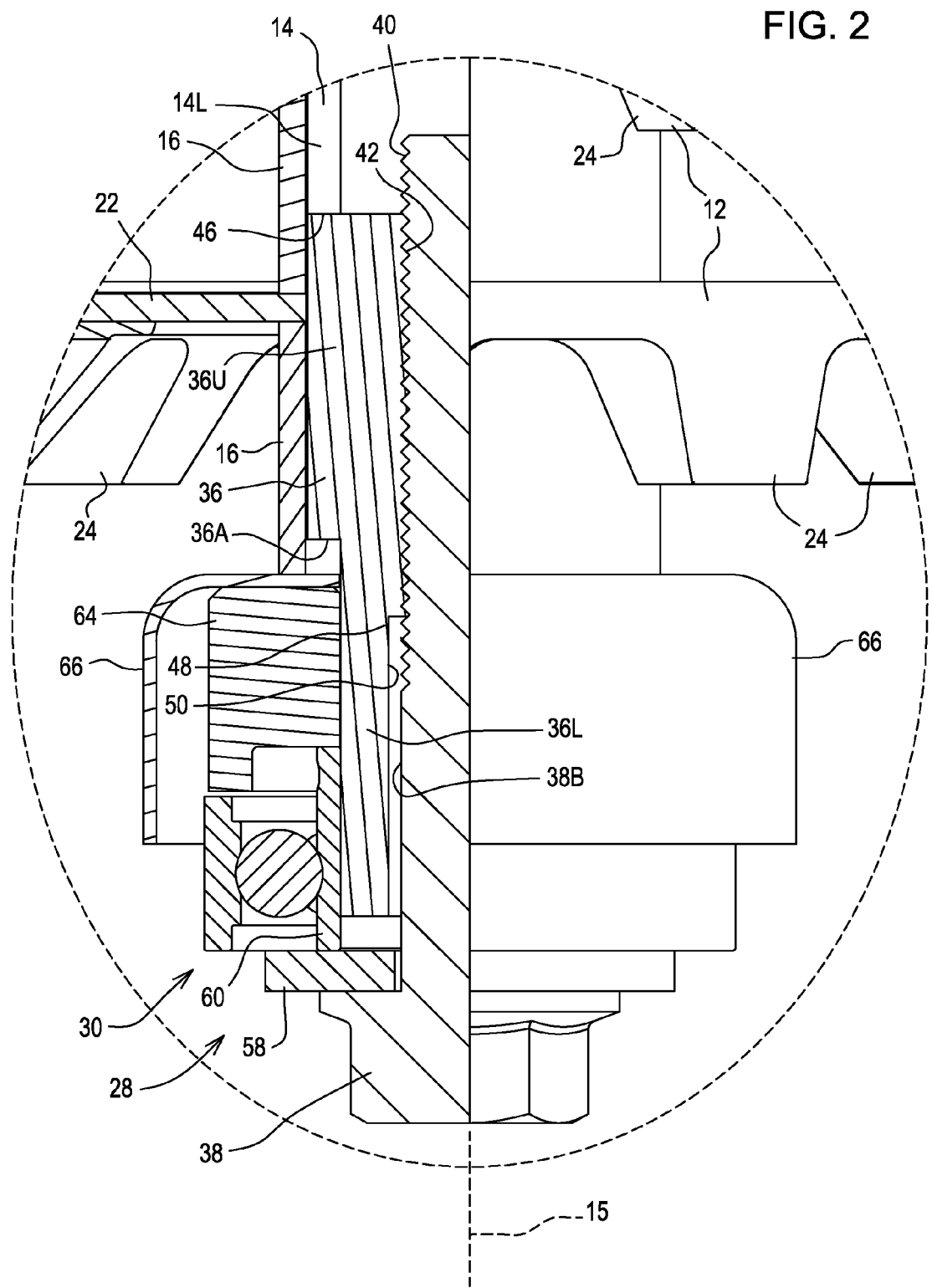
FIG. 2 is an enlarged view, partially in section, of the mounting and column preload assembly of the doffer column assembly of FIG. 1.

As shown in FIG. 2, the member 36 has an upper end 36U with an outer diameter approximately equal to the outer diameter of the shaft 14 with a stepped bore 48, the upper end of which defines the internal threads 42 and the lower end of which defines an enlarged unthreaded bore portion 50. A lower end 36L has a diameter slightly less than the diameter of the upper end 36U. Other configurations of the member 36 may also be used, including but not limited to an internally member formed in or inserted into the end of the shaft 14.

The tensioning member 38 as shown includes a headed end 56 opposite the threads 40 for receiving a tool. A washer 58 is secured between an inner race 60 of the bearing assembly 30 and the headed end 56. A slinger 64 is positioned on the lower end 36L and abuts the upper end of the inner race 60. A cup-shaped shield 66 opens downwardly over the slinger 64 and the bearing assembly 30 and is secured between the lowermost spacer 16 and the slinger 64 for rotation in unison with the inner race 60, slinger 64, and shaft 14.

In the configuration wherein the tensioning member 38 comprises a bolt such as shown in FIG. 2, the bolt is fabricated from a material the has the ability to stretch to a greater extent than the shaft 14 as the bolt is tightened during assembly. Therefore, the preload for the assembly is dependent on the degree the member 38 is threaded into the member 36. As the bolt is tightened, the washer 58, inner race 60, slinger 64, and shield 66 are sandwiched between the headed end 56 and the lowermost spacer 16 which extends downwardly around the member 36 from the lowermost doffer 12. The radially inwardmost portions of the bases 22 of doffers 12 and the spacers 16 (or the doffer hubs) are firmly secured between the bearing assembly 30 and the flange 32 for rotation together. The preload is sufficient to prevent relative rotation between doffer column components. The offset of a stepped portion 36a from the shield 66 facilitates vertical movement of the member 36 relative to the bearing assembly 30 as the bolt head 56 is rotated to adjust the preload. Since a bolt head rather than a thin nut may be used at the bottom of the column, adjustments may be made more easily and more thread engagement may be provided.

By way of example only without limitation, an M16×90 bolt, 8.8 grade, is used for the tensioning member 38. The shaft 14 is hollow with an outer diameter of approximately 1.5 inches (3.8 cm) and is fabricated from metal DOM tubing (ASTM 513 type 5 MD). The outer diameter is greater than the diameter of most previously available conventional doffer column solid shafts. The spacers 16 have a preselected axial length to properly space the doffers 12, and as shown the tensioning member 38 and threaded member 36 have mutual thread engagement approximately equal to the preselected axial length for a firm, reliable connection. A similar length of unthreaded bolt shank 38b facilitates the necessary member stretch for providing the shaft preload condition necessary to assure non-slippage of the doffers 12 relative to the shaft 14 and the spacers 16. The hollow construction facilitates the elimination of a heavier, solid innermost shaft that extends from end to end so that stiffness and critical speed of the doffer column are increased while weight is reduced.

Having described a preferred embodiment, it will become apparent that various modifications can be made without departing from the scope of the invention as defined in the accompanying claims.

The invention claimed is:

1. A doffer column for a row unit of a spindle type cotton harvester, the doffer column comprising:
   an upright shaft having upper and lower mounting ends;
   doffers spaced on the upright shaft;
   spacers extending between the doffers; and
   a retention assembly including an internally threaded member supported at one of the mounting ends of the upright shaft and a tensioning member threaded into the internally threaded member for sandwiching the doffers and spacers between the upper and lower ends for rotation in unison with the upright shaft, the tensioning member providing a preload condition that prevents the doffers from rotating relative to the hollow upright shaft.

2. The doffer column as set forth in claim 1 wherein the tensioning member comprises a bolt that is stretchable to provide the preload condition.

3. The doffer column as set forth in claim 2 wherein the bolt is stretchable to a greater extent than the upright shaft.

4. The doffer column as set forth in claim 1 wherein the shaft is hollow.

5. The doffer column as set forth in claim 4 wherein the diameter of the shaft is approximately 1.5 inches (3.8 cm).

6. A doffer column for a row unit of a spindle type cotton harvester, the doffer column comprising:
   an upright shaft having upper and lower mounting ends;
   doffers spaced on the upright shaft with spacers extending between the doffers;
   a retention assembly including a threaded member supported at one of the mounting ends of the upright shaft and a tensioning member connected to the threaded member for sandwiching the doffers and spacers between the upper and lower ends for rotation in unison with the upright shaft, the tensioning member preventing the doffers from rotating relative to the hollow upright shaft; and
   wherein the upright shaft comprises a hollow shaft.

7. The doffer column set forth in claim 6 wherein the hollow shaft has a diameter of about 1.5 inches (3.8 cm).

8. The doffer column as set forth in claim 6 wherein the threaded member includes an internally threaded member fixed to the lower mounting end.

9. The doffer column as set forth in claim 8 wherein the tensioning member comprises a stretchable bolt and providing a doffer preload condition for preventing relative rotation between the doffers and the shaft.

10. The doffer column as set forth in claim 9 wherein the bolt includes a bolt shank having a first axial length, the spacers have a preselected axial length and wherein the stretchable bolt and threaded member have mutual thread engagement approximately equal to the preselected axial length, the mutual thread engagement being substantially less than the first axial length.

11. A doffer column for a row unit of a spindle type cotton harvester, the doffer column comprising:
    an upright shaft having upper and lower mounting ends;
    doffers spaced on the upright shaft;
    spacers extending between the doffers;
    a retention assembly including an internally threaded bolt-receiving member supported at the lower mounting end of the upright shaft and a tensioning member threaded into the internally threaded member for sandwiching the doffers and spacers between the upper and lower ends for rotation in unison with the upright shaft; and
    a bearing assembly rotatably mounting the upright shaft for rotation about a doffer axis, wherein the tensioning member comprises a bolt with a threaded end received in the internally threaded bolt-receiving member and an opposite headed end, the tensioning member sandwiching the bearing assembly between the headed end and the doffers.

12. The doffer column as set forth in claim 11 wherein the bolt is stretchable to a greater degree than the upright shaft.

13. The doffer column as set forth in claim 11 wherein the headed end comprises a lowermost portion of the doffer column.

14. The doffer column as set forth in claim 12 wherein the upright shaft is hollow.

15. The doffer column as set forth in claim 14 wherein the upright shaft has a diameter of approximately 1.5 inches (3.8 cm).

16. The doffer assembly as set forth in claim 11 including a lowermost spacer extending downwardly around the internally threaded bolt-receiving member from a lowermost doffer.

* * * * *